May 19, 1970     C. F. HUTCHEON     3,512,215
PLASTIC NET EXTRUDING APPARATUS AND PLASTIC NET PRODUCED THEREBY
Filed Aug. 1, 1966     4 Sheets-Sheet 1

INVENTOR.
CHARLES F. HUTCHEON
BY
Leonard H. King
ATTORNEY.

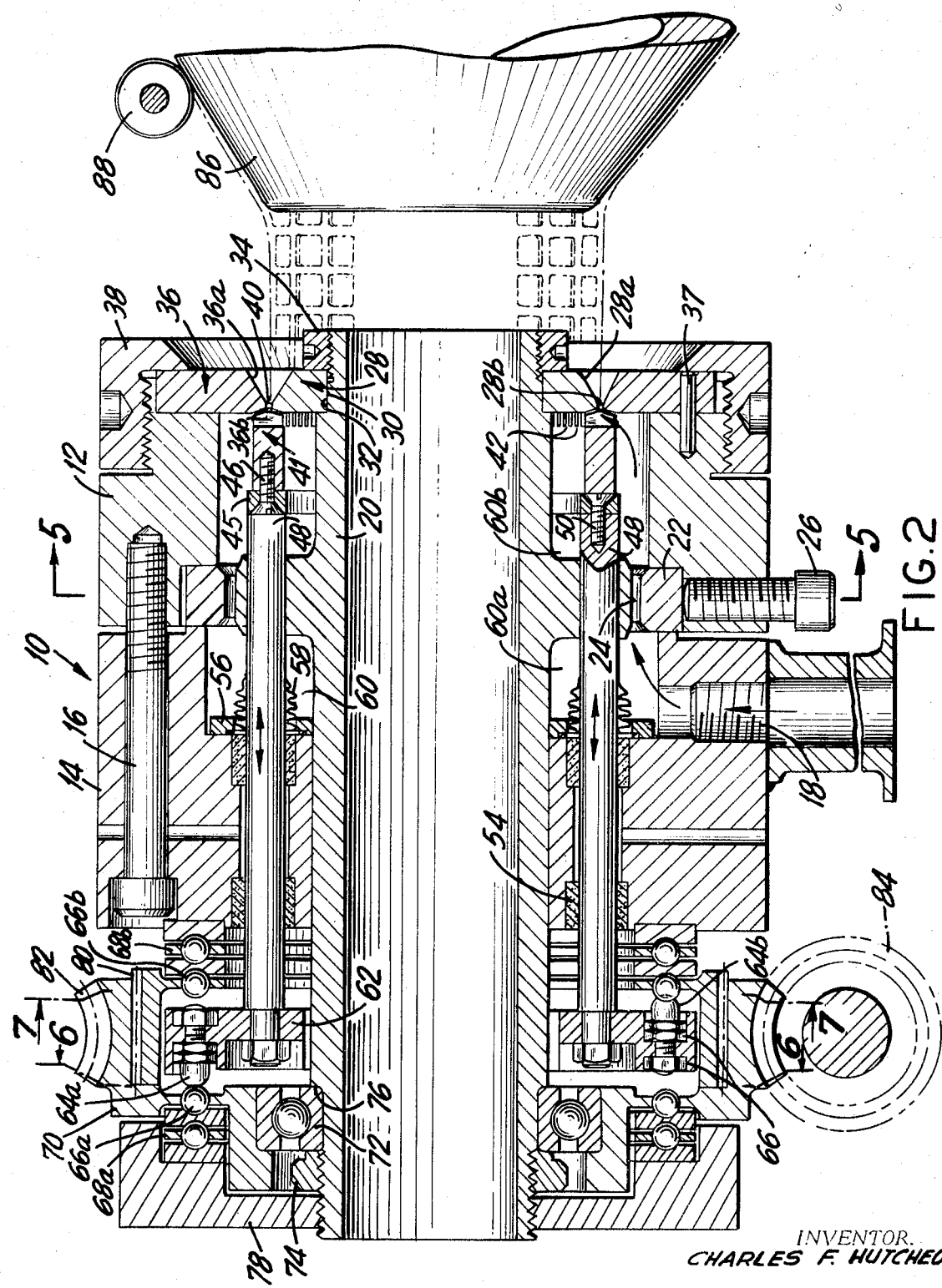

May 19, 1970  C. F. HUTCHEON  3,512,215
PLASTIC NET EXTRUDING APPARATUS AND PLASTIC NET PRODUCED THEREBY
Filed Aug. 1, 1966  4 Sheets-Sheet 3

INVENTOR.
CHARLES F. HUTCHEON
BY
Leonard H. King
ATTORNEY.

May 19, 1970

C. F. HUTCHEON 3,512,215

PLASTIC NET EXTRUDING APPARATUS AND PLASTIC NET PRODUCED THEREBY

Filed Aug. 1, 1966

INVENTOR.
CHARLES F. HUTCHEON
BY
Leonard H. King

ATTORNEY.

United States Patent Office 3,512,215
Patented May 19, 1970

3,512,215
PLASTIC NET EXTRUDING APPARATUS AND PLASTIC NET PRODUCED THEREBY
Charles F. Hutcheon, 192 Shephard Lane,
Roslyn Heights, N.Y. 11577
Filed Aug. 1, 1966, Ser. No. 569,460
Int. Cl. B26d 23/00, 23/04
U.S. Cl. 18—12                    11 Claims

ABSTRACT OF THE DISCLOSURE

An apparatus for extruding a tubular plastic net characterized by warp and woof strands at 90° to each other in a single common plane. The apparatus utilizes an annular extruding die in combination with an oscillating blocking member.

---

This invention relates to plastic netting and to improved apparatus for continuously extruding same.

Plastic netting is becoming increasingly popular as a packaging medium. Because of its decorative effect and because its construction permits the contents of the container to be visible, plastic netting is now being used for packaging food products, for example. Apparatus is presently available for manufacturing a netting on a continuous extruded basis. The present invention is directed to improvements in the apparatus as well as a structually improved net produced thereby.

One example of the prior art is shown in U.S. Pat. 3,227,184, issued to S. P. Anderson et al. on Jan. 4, 1966. Therein separate layers of strips are extruded with the strips being disposed at angles other than 90° with respect to each other. The several layers are "welded," one on top of the other, at the cross-over points of the individual strands. The appearance of the final product leaves much to be desired in that the conventional rectangular or square openings are not present. An even greater drawback is that the strands cross over each other in different planes. The disadvantage of this construction will become apparent from the subsequent discussion of the present invention. The aforementioned patent is particularly directed to apparatus for forming tubular netting that is reinforced primarily in a longitudinal direction.

A French Pat. No. 1,303,014, issued to Societe Anaonyme Rical on July 10, 1961, discloses other apparatus for extruding a tubular plastic net. The Rical patent relies on die plates that are movable in relation to each other. At least one die plate is grooved to allow continuous extrusion of longitudinal strands. Furthermore, as in the Anderson et al. patent, the longitudinal strands and belly band overlay one another in different planes.

The present invention provides two fixed die plates that are immovable with respect to each other. The first or inner die plate is disclike, while the second or outer die plate is ringlike. An annular chamber defining the extruding orifice is disposed between the two die places. Both the longitudinal or warp strands as well as the cross or woof strands are formed in this invention as the plastic material is extruded from the annular chamber between the die plates. The cross and longitudinal strands are alternately formed by the instant apparatus by means of an internal blocking member that is axially movable with respect to the annular extruding orifice.

The tubular blocking member is provided with a plurality of axially disposed slots on its forward end. When the blocking member is retracted and spaced from the annular chamber, an annular band of plastic material is extruded out of the die. When the blocking member is in its forward position and the slots thereof are in substantial abutment with the rear face of the die plates, plastic material is extruded out of the slots in the form of longitudinal strands contiguous with and in the same plane as the annular rings previously extruded. In an alternative embodiment, extensions are provided on the forward end of the blocking member. The extensions are arranged to be disposed within the extruding orifice when the blocking member is forward.

The means for oscillating the blocking member in a rapid back and forth motion is comprised of support means axially displaceable over a relatively short distance in two opposite directions. The support means may be rods, a perforated tube, etc. An external source of power is used to drive camming means whereby a plurality of follower pins integral with the support means are rapidly oscillated.

Both the product and apparatus of this invention have several distinct advantages over the prior art structures presently available. The net produced by this apparatus is provided with 90° joints of high strength. The joints are defined by warp and woof strands in a single plane which are made totally within the extruding apparatus and not outside, as is common with the prior art. With regard to the apparatus, the die blocks themselves do not move. Accordingly, since the oscillating blocking member that forms the joints is not a structural die member, the mass thereof need not be excessive. For this reason very rapid linear oscillation of the blocking member is possible. In addition, the structure of this invention provides positive cutoff of the cross strands.

The die of the present invention may be supported by a hollow nipple. The plastic material is introduced through the hollow nipple to an inlet port on the side of the housing. Further, the construction of the present invention permits easy adjustment of the camming means that impart axial oscillation to the blocking member. Ready access may be had to the extruding orifice and the blocking member for repairs and/or cleaning. In addition, means are provided for axially pulling the net after it is extruded in order to stretch and bidirectionally enlarge the net. Of course, the tubular net may be longitudinally slit and opened to form a flat sheet.

Accordingly, it is an object of this invention to provide improved structure for continuously extruding plastic netting.

Another object is to provide improved means for extruding plastic netting having warp and woof strands at 90° to each other.

A particular object of this invention is to provide improved apparatus for extruding plastic net having the warp and woof strands disposed in a single common plane at their crossover points.

A particular object is to provide improved extruding apparatus for internally forming the crossover points of the warp and woof strands.

Still another object is to provide apparatus for the aforementioned net that has immovable die plates.

A particular object of this invention is to provide extruding apparatus for plastic nets wherein an axially movable internal blocking member is used.

A particular object of this invention is to provide means for rapidly oscillating the aforementioned blocking member.

Another object of this invention is to provide improved flow adjusting means for the fluid plastic used in the net extruding apparatus described herein.

Yet another object is to provide externally adjustable flow regulating means for a net extruding device of the type described herein.

A specific object of this invention is to provide an improved plastic net having rectangular openings.

An additional object is to provide an improved net having openings defined by warp and woof strands disposed in a single common plane at their crossover points.

Yet another object is to provide an improved net having warp and woof strands at 90° to each other.

Still another object is to provide an improved plastic net in tubular form, the net having the characteristic described above.

A further object is to provide an improved plastic net in sheet form, the net having the characteristics described above.

These and other features, objects and advantages of the invention will, in part, be pointed out with particularity and will, in part, become obvious from the following more detailed description of the invention, taken in conjunction with the accompanying drawing, which forms an integral part thereof.

In the various figures of the drawing like reference characters designate like parts.

In the drawing:

FIG. 2 is a longitudinal sectional view taken along line 2—2 of FIG. 1;

Figure 1:
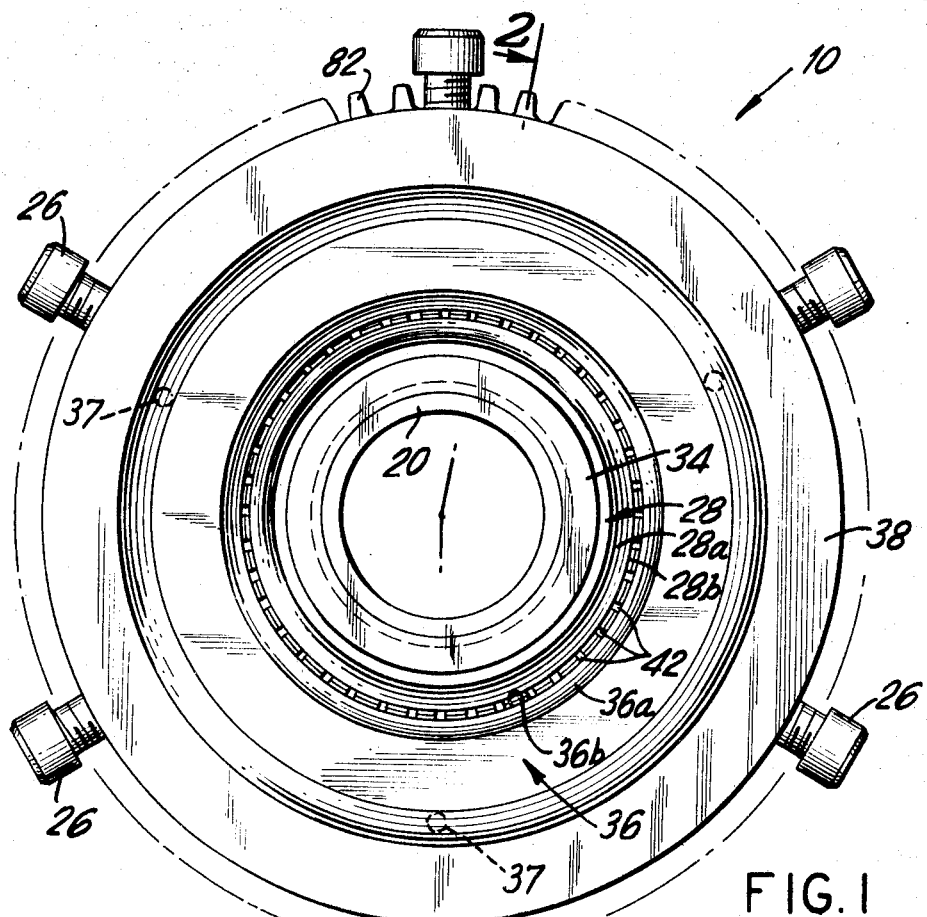
FIG. 1 is an end elevational view of the improved extrusion apparatus forming this invention.
Figure 4:
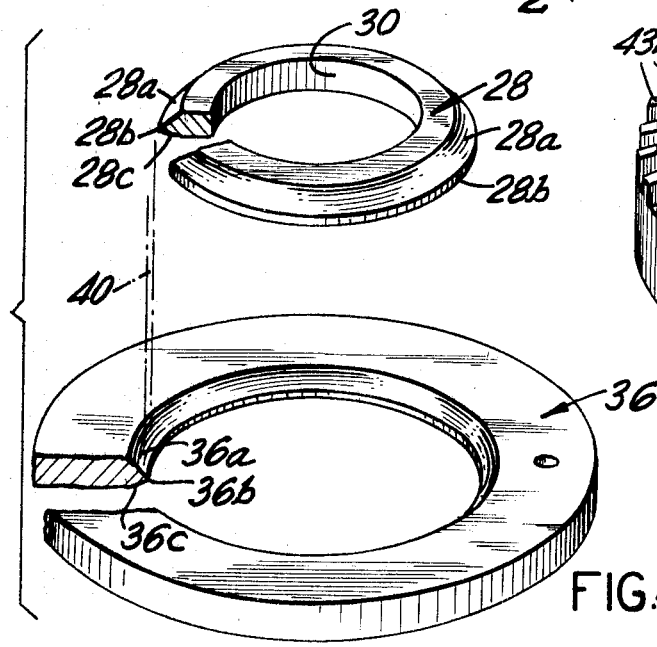
FIG. 4 is a perspective view of the die plates shown in FIG. 2.
Figure 3:
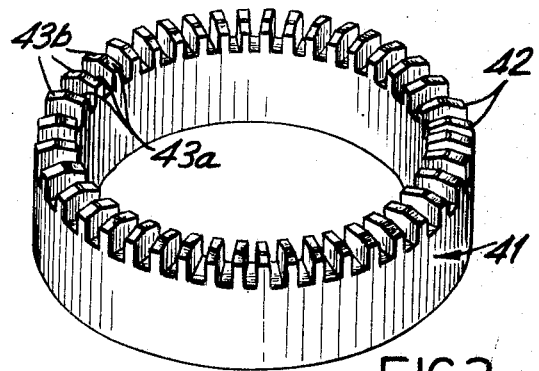
FIG. 3 is a perspective view of the blocking member shown in FIG. 2.

Referring now to FIG. 1 and FIG. 2 of the drawing, it will be seen that the apparatus includes a housing member generally designated by the reference character 10 which is comprised of a first section 12 and a second section 14. A plurality of screws 16 are used to join the two housing sections. Inlet port 18 having suitable support means is provided in housing section 14 for the admission of the plastic material.

A tubular member 20 is disposed within the housing and is adapted to contain conventional net spreading means as well as means for introducing and removing coolant material. The annular space between the central member and the inside of the housing is a fluid plastic reservoir. Flow adjustment ring 22 is positioned between the housing sections such that its inner diameter 24 is in confronting relationship with a portion of the outside diameter of tubular member 20. A plurality of angularly spaced screws 26 are threadably disposed in first housing section 12 such that the inner end of the screws bear against the outside diameter of ring 22. In effect then, ring 24 "floats" whereby the radial dimension between the outside diameter of the tubular member and the inside diameter of the ring may be varied as desired by selectively advancing and retracting screws 26.

The use of a floating flow regulator is an important feature since it compensates for differences in plastic viscosity due to uneven flow of the plastic or differential cooling. Adjustment of the flow rate is made without movement of the die plates. The adjustment is necessary because in a cross head type die, a side entrance of fluid plastic creates an uneven flow rate that is heavier on one side than the other. Another cause of unbalanced flow is due to differences in viscosity of the plastic which may result from nonuniform heating and/or heat dissipation characteristics of the equipment. By adjusting the ring eccentrically about the plastic reservoir, thin and heavy spots around the periphery are avoided.

A first inner die plate 28 is provided with a first conical outside diameter 28a, a contiguous cylindrical diameter 28b, a second conical outside diameter 28c, and a central aperture 30. The inner die plate 28 is seated on a stepdown diameter 32 formed on the forward end of the tubular member. Nut 34, threadably mounted on tubular member 20, secures the first die plate in place.

A second annular die plate 36 is accurately located on the forward end of housing section 12 by means of dowel pins 37 and is secured to the housing by means of nut 38. Die plate 36 is provided with a first internal conical diameter 36a, cylindrical diameter 36b and a second internal conical diameter 36c, all of which are contiguous. It will be seen that the two die plates are on a common transverse plane and define, in combination, an annular extruding orifice 40 therebetween. The die plates are immovable with respect to the housing.

Figure 2A:
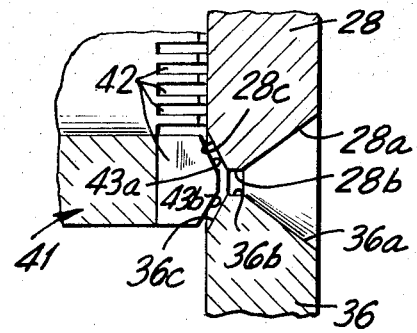
FIG. 2A is an enlarged, fragmentary view, in section, of the extruding orifice with the blocking member shown in retracted position.

An annular blocking member 40, having a plurality of axially extending and radially positioned slots 42 formed in one end, is disposed about the forward end of tubular member 20 to the left of the die plates as seen in FIG. 2. The material between the slots on the forward end face of the blocking member is provided with an annular ridge defining sloped faces 43a and 43b. When the blocking member is forward, the sloped faces 43a and 43b, which are at a shallow angle in the order of 5°–10°, are in abutment with faces 28c and 36c, respectively. The annular ridge in the blocking member is at the center of the annular extruding orifice 40 so that it will be seen that the blocking member is very accurately "piloted." When the blocking member is retracted, the rearward movement being in the order of 0.040 inch, sufficient clearance is provided to permit extrusion of the cross strands. This position is shown in FIG. 2A on an enlarged scale.

Figure 2B:
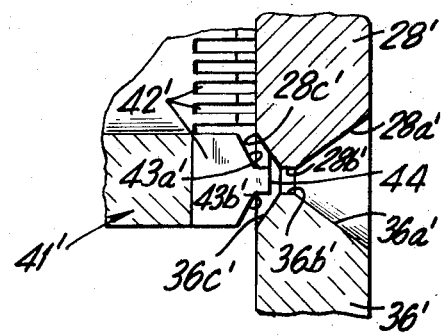
FIG. 2B is an enlarged, fragmentary view, in section of the extruding orifice and an alternative form of blocking member.

An alternative construction for the blocking member is shown in FIG. 2B. Extension 44 are formed integrally with the forward, slotted end of the blocking member 41'. All other elements of the blocking member are denoted by primed reference characters to indicate their similarity with the first embodiment. While the annular ring requires slightly greater axial movement of the blocking member, it does provide a better seal because it actually enters and fills the extruding orifice on the forward stroke of the blocking member.

Figure 5:
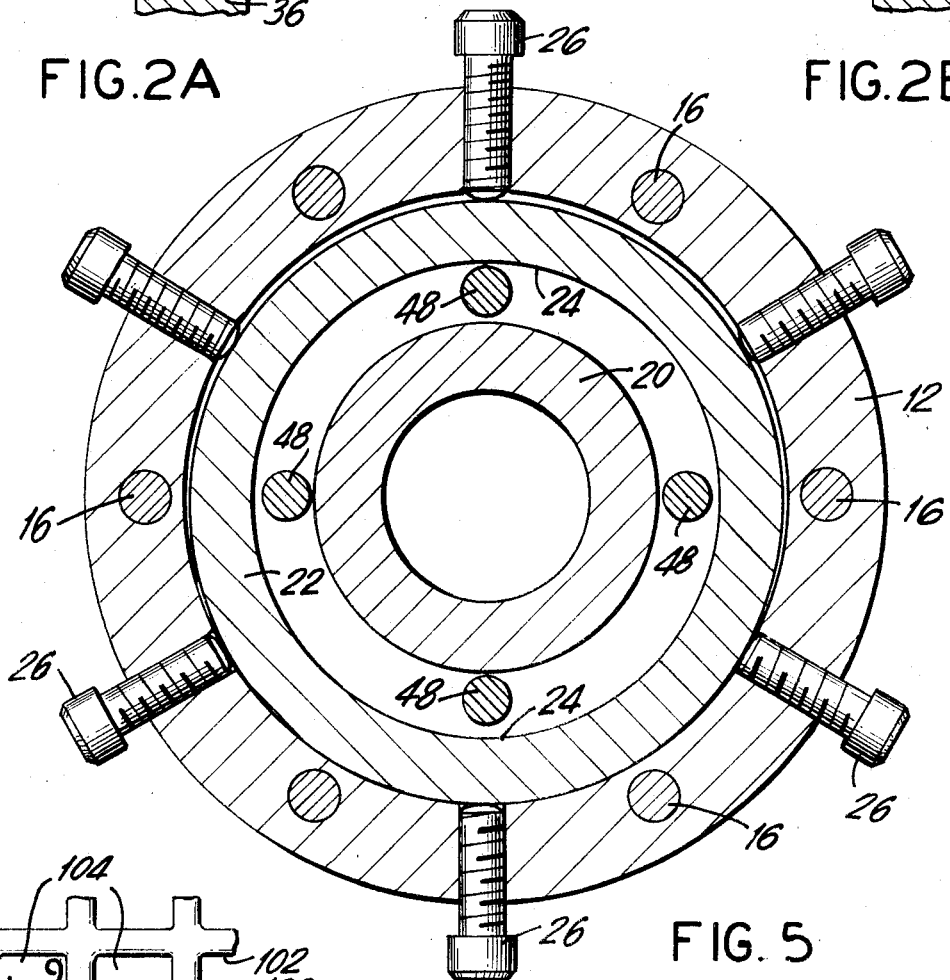
FIG. 5 is a transverse sectional view taken along line 5—5 of FIG. 2.

Blocking member 41 is secured at its rearward end to an annular support plate 45 by means of screws 46. Support means in the form of a plurality of elongated, axially disposed rods 48 are in turn secured to plate 44 by means of screws 50. Alternatively, a perforated tubular member, open to the flow of plastic, may be used. As shown in FIG. 2, rods 48 extend through the fluid plastic reservoir between floating ring 24 and the outside surface of tubular member 20. Rods 48 are suitably journaled in bearings 54 of the permanently lubricated type that are disposed in second housing section 14. It is preferred to provide shaft sealing means such as bellows 58. One end of the bellows is secured to members 14 by flange rings 56 clamped to member 14 by conventional fastening means, such as screws (not shown). The other end is silver-soldered to the rods in order to provide a seal for the annular chambers 60a and 60b that in combination define the fluid plastic reservoir. The annular chambers are bounded by the confronting walls of the tubular member and the housing sections. Although four rods are shown in FIG. 5, it is to be understood that this number may be changed and is governed only by good design techniques and standards.

The opposite end of each rod 48 is secured in a support plate 62 disposed about the tubular member. The plate is provided with a plurality of pins 64a and 64b extending axially in two opposite directions. The pins are adjustably secured therein by means of two lock nuts 66. The oppositely facing, spherical ends of the pins are adapted to bear against a plurality of spherical camming members 66a and 66b. Thrust bearings 68a and 68b rotatably support the spherical camming members 66a and 66b, respectively.

In FIG. 2 it will be seen that the spherical camming members 66a are supported in a plate member 70 that is rotatably mounted on the rearward or leftward end of the tubular member by means of bearing 72. Nut 74 is used in conjunction with an interface 76 on a tubular member to capture the bearing. Nut 78, threadably secured in the lefthand end of the tubular member, captures the thrust bearing 68a. Camming members 66b are mounted in a plate 80 that is splined to plate 70. Thrust bearing 68b is captured between the lefthand end of housing section 14 and the righthand face of plate 80. A gear 82 is formed integrally on the outer surface of plate 70 and is in meshing engagement with a drive pinion 84 that is suitably rotated for example by a motor (not shown). The aforementioned drive means for the oscillating blocking member is used by way of example only. Since other means may be used, it is to be understood that the aforementioned description is not intended to be limiting.

MODE OF OPERATION

A plastic material is fed into chamber 60a through port 18 by conventional means. The plastic material flows into the reservoir and is regulated by adjustment means 24. Depending upon the position of the blocking member 41, the plastic will be extruded through orifice 40 either as a warp strand or a woof strand. If pins 64a are riding on top of camming members 68a, the blocking member will be in its righthand position that is substantially flush with the rearward surface of the die plates. If pins 64b are riding on top of camming members 68b, the blocking member will be in its lefthand position or spaced from the rearward surface of the die plates and the annular chamber therebetween. Pins 64a and 64b are out of phase with each other by one-half the angular distance between any two camming members. Therefore, when one set of pins is riding on top of the associated set of camming members, the counterpart set of pins will be disposed between its associated set of camming members. In this manner pins 64a and 64b alternately engage their respective camming members.

When the blocking member is in abutment with the rear face of the die plates, it will be seen that the righthand end plane of the blocking member closes over the annular extruding orifice, except where axial slots appear. The plastic material may therefore be extruded through the slots and the remaining openings in the annular orifice to form the longitudinal strands. When the blocking member is retracted, the righthand end plane thereof is completely spaced from the annular orifice, so that a ring is extruded. It will be apparent that rapid oscillation of the blocking member by the means described above will cause alternate formation of warp and woof strands. Typically the blocking member moves axially in the order of 0.040 inch.

The thickness and the quantity of the warp strands is determined by the width dimension and the number of the angularly spaced slots formed radially in the end face of the blocking member. The width of each warp strand is determined by the axial length of the slots. The thickness and the quantity of the woof strands are determined by the number and time duration of the blocking member oscillations. Stated another way, the number and angular position of camming members 64a, 64b, 66a and 66b, as well as the number of revolutions per minute of the drive pinion 84, determines the speed of oscillation of the blocking member and therefore the number and dimensions of woof strands formed.

A tapered, elongated mandrel 86, positioned externally of the apparatus and colinear with the longitudinal axis thereof, is used for the purpose of stretching and enlarging the net formed as described. If desired, the tubular net may also be slit by a knife or other suitable cutting means 88 which is schematically shown. This will produce a net sheet.

Figure 8:
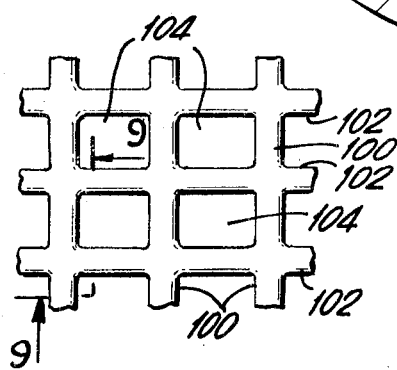
FIG. 8 is a fragmentary plan view of a plastic net extruded by this apparatus.
Figure 9:
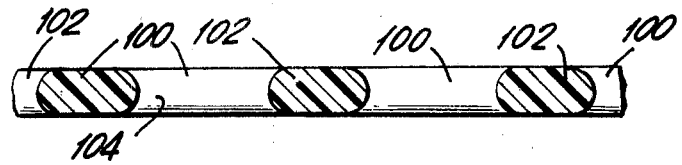
FIG. 9 is a sectional view taken along line 9—9 of FIG. 8.
Figure 6:
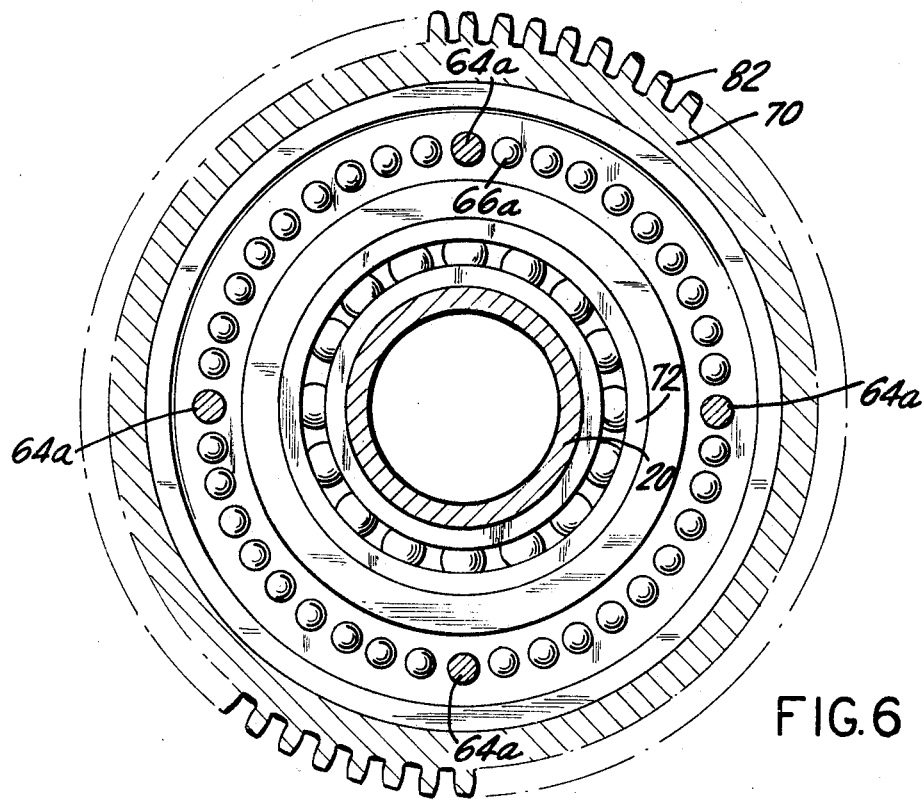
FIG. 6 is a transverse sectional view taken along line 6—6 of FIG. 2.
Figure 7:
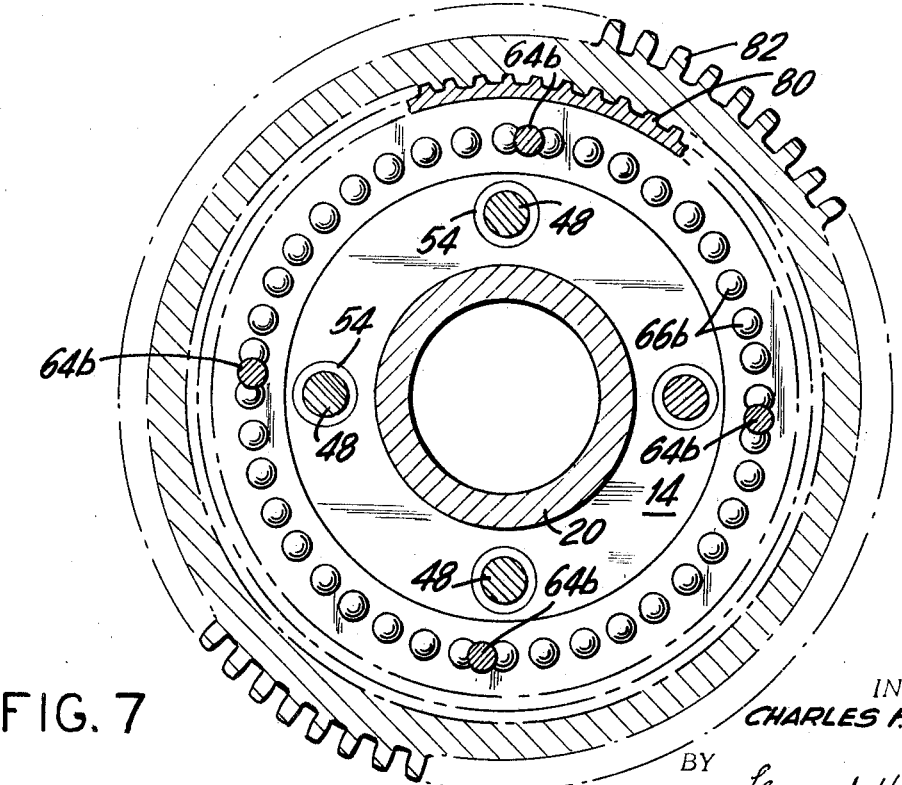
FIG. 7 is a transverse sectional view taken along line 7—7 of FIG. 2.

A fragment of a plastic net extruded by the aforementioned apparatus is illustrated in FIG. 8 and FIG. 9. An important feature of this portion of the invention is that strands 100 and 102, defining apertures 104, are not only at right angles to each other but are also in a single common plane. It will be readily apparent that the homogenous joints formed at the crossover of two strands will be stronger than the prior art wherein the two directions of strands are in different planes and "welded" to each other at each point of contact. While only a rectangular pattern has been illustrated, it is also within the scope of the invention to extrude a plastic net having square openings. The position of the long and short sides of the rectangular net is a function of the relationship of the internal structure as described above in conjunction with the apparatus illustrated.

From the foregoing it will be apparent that the "knitting" operation is formed entirely within the apparatus and does not rely on movable die plates as does the prior art. It will also be seen that the longitudinal and cross-strands are in common planes and not overlaid, as is common with the structure heretofore used. The warp and woof strands are continuously extruded at 90° to each other by means of a rapidly oscillated internal blocking member that has radial slots in opposition to an annular extruding orifice. It is also an important feature that the die plates and blocking member are readily accessible for cleaning, repair or replacement. In addition, the means to axially move the blocking member are also readily accessible for the same purpose.

Having thus disclosed the best embodiment of the invention presently contemplated, it is to be understood that various changes and modifications may be made by those skilled in the art without departing from the spirit of the invention.

What is claimed is:

1. Apparatus for extruding a plastic net characterized by warp and woof strands at 90° to each other, the strands being in a single common plane; said apparatus comprising:
   (a) a housing having an inlet port for the admission of a fluid plastic;
   (b) a first die plate rigidly secured transversely in said housing, said first die plate having front and rear surfaces;
   (c) a second ringlike die plate rigidly secured transversely in said housing in spaced concentric relationship about said first die plate to define an annular extruding orifice therebetween, said second die plate having front and rear surfaces;
   (d) a blocking member axially slidable in said housing, one end face of said blocking member having a plurality of slots positioned in opposition to the rear surfaces of said first and said second die plates and to the annular orifice therebetween; and
   (e) drive means arranged to axially oscillate said blocking member.

2. The apparatus in accordance with claim 1 wherein said first die plate includes a tapered inner diameter and a cylindrical diameter contiguous with tha tapered diameter and wherein said second die plate includes an outside diameter portion tapered at an opposite angle to the tapered diameter of said first die plate, said second die plate having a cylindrical diameter contiguous with the tapered diameter thereof, the cylindrical diameter of said second die plate being smaller than the cylindrical diameter of said first die plate and concentrically disposed therewithin.

3. The apparatus in accordance with claim 1 wherein said blocking member is tubular and the slots are formed radially in one end wall thereof, the slots having substantially straight, parallel side walls extending axially in the wall of said blocking member.

4. The apparatus in accordance with claim 1 wherein said slotted end face of said blocking member includes an integral, annular ring extending axially therefrom said ring being adapted to be alternately positioned in and displaced from the annular orifice by said drive means, said ring having a plurality of slots continuous with the slots in said blocking member end face.

5. The apparatus in accordance with claim 2 wherein said slotted end face of said blocking member includes an annular ridge defining two sloping surfaces and the rear surface of each said die plate opposed to said blocking member end face includes a sloping portion at substantially the same angle as one of said sloping surfaces on said slotted end face of said blocking member.

6. The apparatus in accordance with claim 1 including flow adjustment means positioned in said housing intermediate the plastic inlet port and the extruding orifice.

7. The apparatus in accordance with claim 6 wherein said housing includes a plastic reservoir and said flow adjustment means is an annular ring at least partially disposed within said reservoir and radially positionable with respect thereto.

8. The apparatus in accordance with claim 6 wherein said housing is hollow and includes a central member defining an annular fluid plastic reservoir with respect to the inside wall of said housing, said adjustment means comprising (a) an annular ring disposed about said central member, said ring having the inside surface disposed in opposition to said central member, and (b) means to vary the radial dimension between said central member and the inside surface of said ring whereby said central member and said ring are eccentric with respect to each other.

9. The apparatus inn accordance with claim 8 wherein the inside surface of said ring is radially adjustable with respect to said central member.

10. The apparatus in accordance with claim 1 wherein said drive means comprises:
   (a) support means open to the flow of plastic, said support means being rigidly secured at a first end to said blocking member;
   (b) cam follower means integral with said support means;
   (c) cam means in operative engagement with said cam follower means; and
   (d) said drive means providing relative motion between said cam follower means and said cam means whereby said blocking member oscillates axially and is thereby moved towards and away from the annular extruding orifice.

11. The apparatus in accordance with claim 10 wherein said support means comprises a plurality of rods.

References Cited
UNITED STATES PATENTS

| | | | |
|---|---|---|---|
| 1,371,576 | 3/1921 | Royle | 18—14 |
| 3,147,515 | 9/1964 | Amsden | 18—14 |
| 3,221,371 | 12/1965 | Stevens | 18—14 X |
| 3,252,181 | 5/1966 | Hureau | 18—12 |
| 3,314,107 | 4/1967 | Honstrater | 18—14 |
| 3,349,434 | 11/1967 | Hureau | 18—14 XR |
| 3,381,337 | 7/1968 | Hureau | 18—12 |
| 3,423,793 | 1/1969 | Anger | 18—14 X |

WILLIAM J. STEPHENSON, Primary Examiner

U.S. Cl. X.R.

18—14